United States Patent [19]
Takata et al.

[11] Patent Number: 6,119,136
[45] Date of Patent: Sep. 12, 2000

[54] MANUSCRIPT TEXT COMPOSITION SYSTEM FEATURING A PARAMETER TABLE FOR SPECIFYING TEMPLATE PARAMETERS AND CHARACTERS

[75] Inventors: Hiroaki Takata; Katsuhiko Ashimoto, both of Ishikawa, Japan

[73] Assignees: PFU Limited, Ishikawa; Fujitsu Limited, Kawasaki, both of Japan

[21] Appl. No.: 09/051,272

[22] PCT Filed: Aug. 15, 1997

[86] PCT No.: PCT/JP97/02839

§ 371 Date: Sep. 21, 1998

§ 102(e) Date: Sep. 21, 1998

[87] PCT Pub. No.: WO98/08168

PCT Pub. Date: Feb. 26, 1998

[30] Foreign Application Priority Data

Aug. 16, 1996 [JP] Japan ..................................... 8-216239
Aug. 12, 1997 [JP] Japan ..................................... 9-217238

[51] Int. Cl.[7] .................................................. G06F 17/30
[52] U.S. Cl. ........................................ 707/513; 707/501
[58] Field of Search ................................... 707/102, 501, 707/513

[56] References Cited

U.S. PATENT DOCUMENTS

| | | | |
|---|---|---|---|
| 5,313,394 | 5/1994 | Clapp | 707/531 |
| 5,644,776 | 7/1997 | DeRose et al. | 707/500 |
| 5,745,889 | 4/1998 | Burrows | 707/2 |
| 5,794,259 | 8/1998 | Kikinis | 707/507 |
| 5,835,712 | 11/1998 | DuFresne | 709/203 |

FOREIGN PATENT DOCUMENTS

| | | |
|---|---|---|
| 0 394 168 A2 | 10/1990 | European Pat. Off. . |
| 60-176784 | 9/1985 | Japan . |
| 4-280365 | 10/1992 | Japan . |
| 4-319763 | 11/1992 | Japan . |
| 5-108636 | 4/1993 | Japan . |
| 6-332888 | 2/1994 | Japan . |
| 8-83279 | 3/1996 | Japan . |
| 8-190636 | 7/1996 | Japan . |
| 9-16564 | 1/1997 | Japan . |

*Primary Examiner*—Thomas G. Black
*Assistant Examiner*—William Trinh

[57] ABSTRACT

A manuscript text composition system and a program storage medium for the same specify data groups with a plurality of dimensions using a parameter table having two or more dimensional coordinate axes to manage data. In pasting specific data, a manuscript text composition system and a program storage medium for the same make it possible to paste specific data after various processing has been conducted. In pasting specific data using templates that enable characters and images to be pasted in a replaceable manner using replacement detection keys, a manuscript text composition system and a program storage medium for the same set parameters used in each corresponding template, and specify the parameters by the replacement detection keys themselves so that each specific processing can be conducted.

20 Claims, 14 Drawing Sheets

FIG. 1

OPERATING PRINCIPLE OF THIS INVENTION

PARAMETER SETTING TABLE 1

|   | A | B | C | D | E |
|---|---|---|---|---|---|
| 1 |   | 300 | 400 |   |   |
| 2 | FORMAT 1 | KOTEI A | ZUMEN 1 | TORITSUKERU | KENSA KOTEI |
| 2 |   |   |   |   |   |

FORMAT 1.TXT

2 : TEMPLATE

```
<HTML>
<TITLE>TEST</TITLE>
<HR><BR><A NAME =@B@>@B@</A><BR>
<IMG SRC="@C@.gif" ALIGN="left"
            WIDTH=@B1@ HEIGHT=@C1@>
<FONT COLOR=Black>@D@</FONT><BR>
<A HREF="#@E@">@E@</A>
<BR>
</HTML>
```

TRANSLATED TEMPLATE CONTENTS 3

```
<HTML>
<TITLE>TEST</TITLE>
<HR><BR><A NAME=KOTEI A>KOTEI A</A><BR>
<IMG SRC="ZUMEN 1.gif" ALIGN="left"
            WIDTH=300 HEIGHT=400>
<FONT COLOR=Black>TORITSUKERU</FONT><BR>
<A HREF="#KENSA KOTEI">KENSA KOTEI</A>
<BR>
</HTML>
```

FIG. 3 SYSTEM CONFIGURATION OF THIS INVENTION

FIG. 5

EXAMPLE OF PARAMETER SETTING TABLE

| | A<br>COMMAND OR TEMPLATE NAME | B<br>PROCESS NAME | C<br>GRAPHIC DATA NAME (FILE NAME) | D<br>TEXT OF WORK DESCRIPTION | E<br>TEXT OF PRECAUTIONS | F<br>NEXT PROCESS NAME (JUMP ADDRESS) | G |
|---|---|---|---|---|---|---|---|
| 1 | | | | | | | |
| 2 | FORM 1 | NEJI KOTEI | HIDARIGAWA ITA ZU | UEGAWA KARA SHIMERU | 5 KG IKA | KENSA KOTEI | |
| 3 | FORM 10 | | | YOKO KARA SHIMERU | | | |
| 4 | | | | | | | |
| 5 | | | | | | | |
| 6 | GTT | GRAPHIC | TEXT A | TEXT B | | | |
| 7 | | | | | | | |
| 8 | | | | | | | |
| 9 | | | | | | | |

FIG. 6

EXAMPLE OF IDENTIFICATION BY CELL-DESIGNATING REPLACEMENT DETECTION KEY

〜 @Z3@ 〜

PARAMETER SETTING TABLE

|   | A | B | ··········· | Z |
|---|---|---|---|---|
| 1 |   |   |   |   |
| 2 |   |   |   | △ |
| 3 |   |   |   | ※ |
| 4 |   |   |   | ○ |
| 5 |   | YUHI |   |   |

(※ CONTENTS OF Z3 : ASAHI ①
    : B5 ②)

EXAMPLE ①　　　　　　　②

〜 ASAHI 〜　　　　〜 YUHI 〜

CONTENTS OF Z3

| EXAMPLE ① | ASAHI |
|---|---|
| EXAMPLE ② | B5 |
| EXAMPLE ③ | TITLE TXT. |
| EXAMPLE ④ | _FILE. CLASS |

FIG. 7

EXAMPLE OF DESIGNATION OF CELL RELATIVE POSITION

| | DESIGNATED POSITION |
|---|---|
| ~ @Z3@ ~ | Z3 |
| ~ @Z3+@ ~ | Z4 |
| ~ @Z3-@ ~ | Z2 |

FIG. 8

DESIGNATION OF REPLACEMENT DETECTION KEY

| @···@ | REPLACE CONTENTS BETWEEN @ |
|---|---|
| %···% | DITTO |
| ~ | ~ |
| !···% | CONTENTS IN BETWEEN ARE A FILE NAME |
| !···! | CONTENTS IN BETWEEN ARE A FILE NAME, WHICH IS REPLACED IF IT HAS ITS UPDATING HISTORY |
| #···% | DATES NEWER THAN THE DATA DESCRIBED IN BETWEEN ARE DISPLAYED BY CHANGING COLORS |
| %-!% | AFTER THIS KEY, REPLACEMENT DETECTION KEY! IS INVALID |
| %+!% | AFTER THIS KEY, REPLACEMENT DETECTION KEY! IS VALID |

FIG. 9

DESCRIPTION ABOUT MARKS BEING USED a) THE NORMAL REPLACEMENT DETECTION KEYS USE IDENTICAL MARKS BEFORE AND AFTER THE CONTENTS
EX.)%···%  #···# b) DIFFERENT MARKS ARE USED BEFORE AND AFTER THE CONTENTS
EX.)%···#  @···% c) A PLURALITY OF MARK PAIRS ARE USED
EX.)%−···%  %+···%  %!···% d) A PLURALITY OF MARKS ARE USED
EX.)%%···%%  %%···%  %···%%

FIG. 10

TYPES OF NORMAL REPLACEMENT INSTRUCTIONS

| | | |
|---|---|---|
| | ~%B%~ | : NORMAL REPLACEMENT |
| a) | ~%B%~ | : INSERT THE CONTENTS OF COLUMN B IN THE TABLE |
| b) | ~%B1%~ | : INSERT THE CONTENTS OF COORDINATE B1 IN THE TABLE |
| c) | ~%B1:C2%~ | : INSERT THE CONTENTS OF COORDINATE B1~C2 IN THE TABLE |
| d) | ~%FILE.TXT%~ | : INSERT THE CONTENTS OF TEXT FILE "FILE.TXT" |
| e) | ~%<B1;C2>FILE.CSV%~ | : INSERT THE CONTENTS OF COORDINATES B1~C2 IN TABLE "FILE.CSV" |
| f) | ~%<OL TYPE=1>FILE.TXT%~ | : INSERT "FILE.TXT" AFTER IT IS CONVERTED WITH A FORMAT IN<···> |
| g) | ~%*.TXT%~ | : INSERT THE CONTENTS OF ANY TEXT FILE WHICH HAS AN EXTENSION OF.TXT,REGARDLESS OF ITS FILE NAME |
| h) | ~%ABC*.TXT%~ | : INSERT THE CONTENTS OF ANY TEXT FILE WHOSE FILE NAME IS PREFIXED BY ABC AND HAS AN EXTENSION OF.TXT |

FIG. 11

NO. OF VERSIONS PROCESSING a) ~-...+~ : IF THERE EXISTS ANY FILE OF ONE VERSION NEWER THAN THE CURRENT ONE, PASTE IT b) ~-...%~ : PASTE A FILE OF THE LATEST VERESION c) ~-...-~ : IF THERE EXISTS ANY FILE OF ONE VERSION OLDER THAN THE CURRENT ONE, PASTE IT d) ~-...%~ : PASTE A FILE OF THE FIRST VERSION (OLDEST)

e) ~+...~ : IF THESE ARE FILES OF DIFFERENCE VERSIONS, INSERT THEM BY CHANGING COLORS

FIG. 12

REPETITION CONTROL a) ~!...%...%...!~ : REPEAT THE CONTENTS BETWEEN! BY THE NUMBER OF INSERTIONS OR CONTINUED ROWS BETWEEN %

EX.) TEMPLATE : ~!<A NAME=%<B1 ; B3>%>!~
TABLE : B1=AAA,B2=BBB,B3=CCC
<A NAME=AAA><A NAME=BBB><A NAME=CCC> : REPEAT THREE TIMES

FIG. 13

REPLACEMENT CONTROL a) ~%-!%~ : AFTER THIS KEY, MARK! IN THE REPLACEMENT DETECTION KEY IS MADE INVALID b) ~%-!%~ : AFTER THIS KEY, MARK! IN THE REPLACEMENT DETECTION KEY IS MADE VALID

FIG. 14

TEMPLATE FETCH a) ~%#...%~ : FETCH ANOTHER TEMPLATE (A HIERARCHICAL STRUCTURE OF TEMPLATE WHERE THE TEMPLATE NAME IN QUESTION IS DESCRIBED AFTER #)

EX.) ~...%#HINA 1%...~ IF THE CONTENTS OF HINA 1 ARE ~%B1%~%C2%~, THE DESCRIPTION IS REPLACED BY -> ~...~%B1%~%C2%~

FIG. 15

IMAGE FILE  5

| FILE 1 | 01 | GIF | 96/04/14 |
|---|---|---|---|
|  | 02 | GIF | 96/04/18 |
|  | 03 | GIF | 96/05/03 |
|  | 04 | GIF | 96/05/04 |
|  | 05 | GIF | 96/05/11 |
|  | 06 | GIF | 96/05/13 |

−FILE1.GIF−
%FILE1.GIF%
+FILE1.GIF+

+FILE1.GIF%

%FILE1.GIF%
(THE CONTENTS OF FILE1.GIF
ARE PASTED AS THEY ARE)

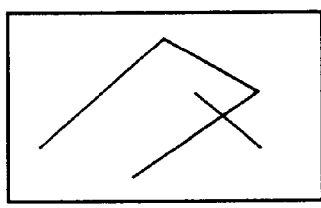

+FILE1.GIF+
(IF THERE IS ANY FILE
OF ONE VERSION NEWER
THAN THE CURRENT ONE,
REPLACE THE FILE WITH IT)

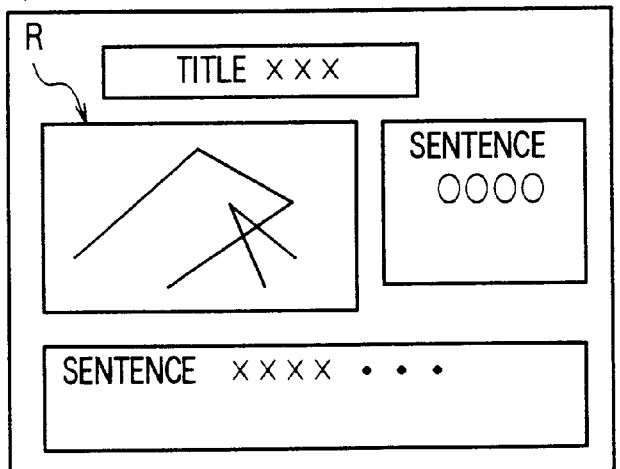

(IN THE CASE OF ~+FILE1.GIF+~)

−FILE1.GIF−
(IF THERE IS ANY FILE
OF ONE VERSION OLDER
THAN THE CURRENT ONE,
REPLACE THE FILE WITH IT)

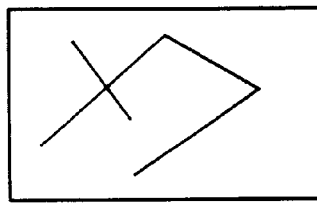

FIG. 17

DESIGNATION OF MULTIPLE TEMPLATES

RULE

TEMPLATE IDENTIFICATION MARK + TEMPLATE NAME
    + SEPARATION SYMBOL + OUTPUT DESTINATION NAME

| | |
|---|---|
| TEMPLATE IDENTIFICATION MARK | : "!" |
| TEMPLATE NAME | : FORMAT 1 |
| SEPARATION SYMBOL | : " : " |
| OUTPUT DESTINATION NAME | : SENTENCE 1 |
| RESULT→! FORMAT 1 | : SENTENCE 1 |

TEMPLATE

FORMAT 1  KONNICHIWA%C%SAN, GENKI DESUKA
    FORMAT 2  %C%SAN, OMEDETO

PARAMETER SETTING TABLE    1

| A | B | C |
|---|---|---|
| !FORMAT 1 : SENTENCE 1 | !FORMAT 2 : SENTENCE 2 | NAKAMURA |

FIG. 18

REPLACEMENT AFTER CHECK OF CONDITIONS

RULE
%COMPARISON ROW="CONDITION VALUE" TRUE REPLACEMENT ROW : FALSE REPLACEMENT ROW%

PARAMETER SETTING TABLE 1

| COLUMN A | COLUMN B | COLUMN C | COLUMN D |
|---|---|---|---|
| FORM 10 | KOTEI 1 | | BASHO 1 |
| | | | BASHO 2 |
| | KOTEI 3 | | BASHO 3 |
| | KOUTEI 4 | | |
| | | | |

TEMPLATE :
    KYO NO SHIGOTO WA%B=" " : B− : B%DE OKONAI,
    BASHO WA%D=" " : D+ ; D%DESU.

CONVERSION RESULT
    CONVERSION RESULT FOR DATA IN 1ST ROW OF TABLE :
        KYO NO SHIGOTO WA KOTEI 1 DE OKONAI,
        BASHO WA BASHO 1 DESU.
    CONVERSION RESULT FOR DATA IN 2ND ROW OF TABLE :
        KYO NO SHIGOTO WA KOTEI 1 DE OKONAI,
        BASHO WA BASHO 2 DESU.
    CONVERSION RESULT FOR DATA IN 3RD ROW OF TABLE :
        KYO NO SHIGOTO WA KOTEI 3 DE OKONAI,
        BASHO WA BASHO 3 DESU.
    CONVERSION RESULT FOR DATA IN 4TH ROW OF TABLE :
        KYO NO SHIGOTO WA KOTEI 4 DE OKONAI.
        BASHO WA BASHO 1 DESU.

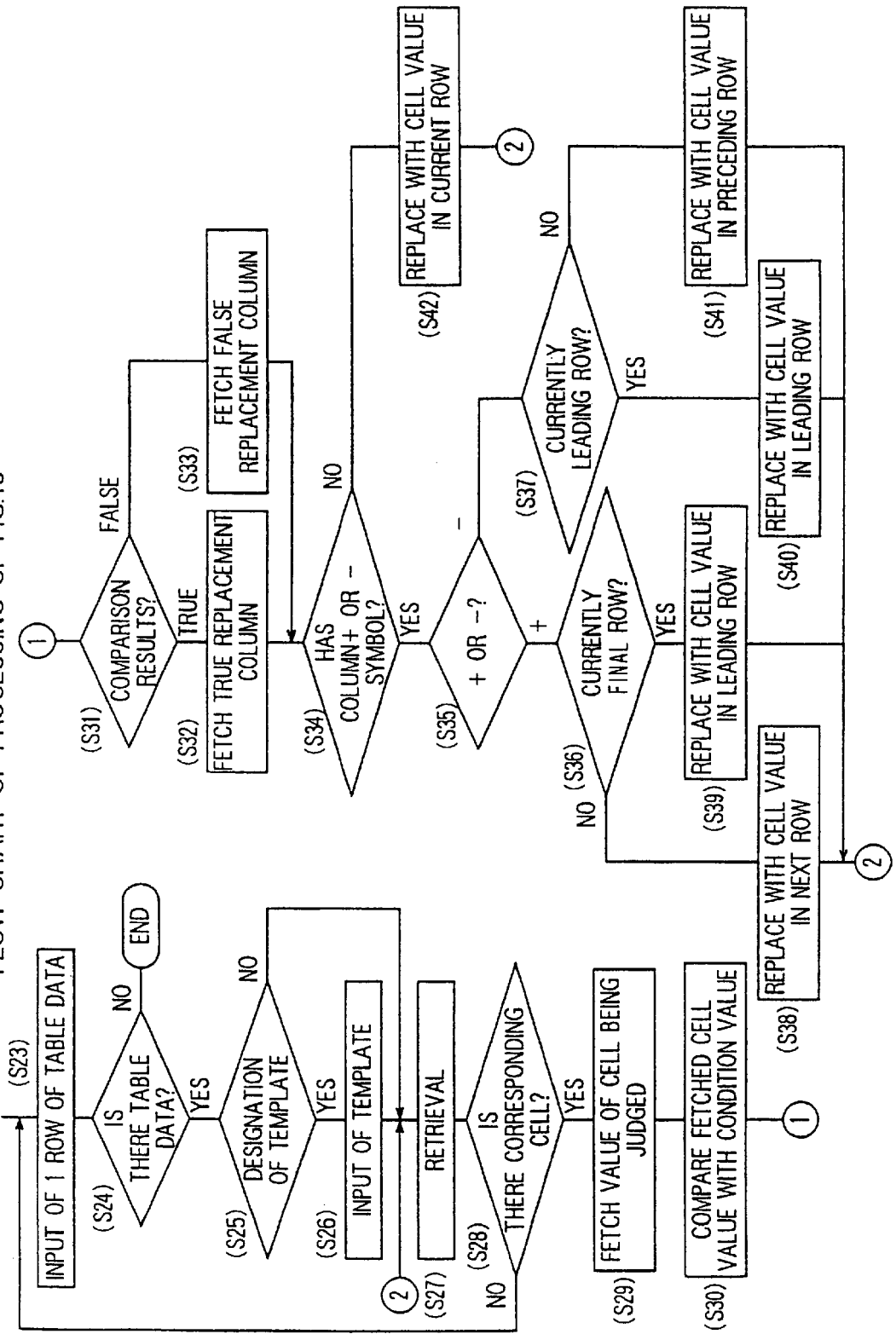
FIG. 19 FLOW CHART OF PROCESSING OF FIG.18

MANUSCRIPT TEXT COMPOSITION SYSTEM FEATURING A PARAMETER TABLE FOR SPECIFYING TEMPLATE PARAMETERS AND CHARACTERS

BACKGROUND OF THE INVENTION

1. Field of the invention

This invention relates generally to a manuscript text composition system and a program storage medium for implementing the manuscript text composition system, and more specifically to a manuscript text composition system and a program storage medium for implementing the manuscript text composition system adapted so that a desired manuscript text can be prepared by placing replacement detection keys in templates, and whenever the existence of such replacement detection keys are detected, pasting up specific characters or character groups, or specific images at the positions of such replacement detection keys, and also adapted so that the aforementioned specific characters or character groups, or specific images being pasted can be effectively managed by providing parameter tables having two or more dimensional coordinate axes.

2. Description of the Related Art

In recent years, application fields have been expanding, where a large amount of data prepared in a hypertext format are displayed in the Internet, for example. To prepare a manuscript text suitable for such application fields, a template for a manuscript text is prepared, in which replacement detection keys are placed so that a specific manuscript text can be composed by pasting specific characters or character groups, or specific images at the locations of the replacement detection keys.

That is, a template containing a sentence such as

"Konnichiwa, XX-san, genki desuka" (Good day, XX-san, how are you?)

is prepared, and a large number of first names, such as "Tanaka," "Nakamura," etc. to be pasted at the position of XX in the template are separately prepared in advance. Thus, a specific manuscript text such as "Konnichiwa, Nakamura-san, genki desuka" (Good day, Nakamura-san, how are you?)

is composed by pasting a first name, such as "Nakamura" at the location of XX.

Although preparing a specific manuscript text by the aforementioned pasting operation is one of preferable methods, it would become more and more difficult to effectively manage "data" corresponding to specific characters or character groups, or specific images being pasted as an increasing number of templates are required and enormous quantities of specific characters or character groups, or specific images being pasted have to be provided in advance. That is, link structures, particularly among data, have been increasingly complicated and unclear.

As described above, the fact that link structures for specific data have become increasingly complicated and unclear has necessitated the development of methodology for effectively specifying those specific data. In pasting specific data in the aforementioned manner, it is often desired to identify data by color display, or by blinking or highlighting. Specific measures to implement this are also needed. Furthermore, in pasting specific data which are updated in time series, for example, some measures are needed, such as finding out and pasting the latest version of data that are updated from time to time.

SUMMARY OF THE INVENTION

It is an object of this invention to provide a manuscript text composition system that enables data to be managed by specifying data groups with a plurality of dimensions using a parameter table having two or more dimensional coordinate axes.

It is another object of this invention to provide a manuscript text composition system that enables specific data to be pasted after various types of processing have been executed on them.

It is still another object of this invention to provide a program storage medium that stores programs for implementing a manuscript text composition system that enables data to be managed by specifying data groups with a plurality of dimensions using a parameter table having two or more dimensional coordinate axes.

It is a further object of this invention to provide a program storage medium that stores programs for implementing a manuscript text composition system that enables specific data to be pasted after various types of processing have been executed on them.

The manuscript text composition system of this invention has templates for any one or all of texts and images that specify with replacement detection keys that part of the texts can be replaced with specific characters or character groups, or part or all of the images can be replaced with specific images, and files that store the specific characters or character groups, and the specific images specified by the replacement detection keys; a compiler provided in the system creating an image generating program using one of the templates, the specific characters or character groups, or the specific images stored in the aforementioned files; a display unit provided in the system creates a manuscript text on which the specific characters or character groups and/or the specific images are pasted corresponding to one of the templates. The manuscript text composition system of this invention has a parameter table that specifies parameters corresponding to the specific characters or character groups, or the specific images in a tabular form having two or more dimensional coordinate axes so as to represent one of the templates by one or a plurality of rows in one coordinate axis in the parameter table.

According to an embodiment of this invention, templates describe in such a manner that voice can be replaced. According to another embodiment of this invention, replacement detection keys in templates specify, by the existence thereof, cells at coordinate locations in a parameter table, specific file names or specific command names or specific conditional expression names, or a plurality of cells enclosed by a plurality of coordinate locations in the parameter table. When the replacement detection keys specify directly, by the presence thereof, specific file names, etc., parameters relating to the files specified are described in the parameter table. When specific command names, etc. are specified, processing, including replacement, is carried out after the specific commands, etc. have been executed.

According to still another embodiment of this invention, the name of one template that has been specified as described above, a specific character or character group or a specific image to be replaced, a coordinate value specifying another cell in the parameter table, or a specific file name or specific command name or a specific conditional expression name is described in one cell of the parameter table. When a template name is described in any one or multiple given (predetermined) cells in the parameter table, a notation combining "a template identification mark with the template name" is used to indicate that the individual given (predetermined) cell or cells specify the template. When a specific file name, etc. is described in a cell of the parameter table, parameters relating to the file, etc. specified by the description are described in the parameter table. When a specific command name is described, processing, including replacement, is carried out after that specific command has been executed.

According to still another embodiment of this invention, furthermore, a replacement detection key is recognized by the system when a predetermined mark character is identified as the replacement detection key, or a replacement detection key is made invalid or valid in the subsequent processing by a description that the replacement detection key having a predetermined mark should be made invalid or valid, or the type of processing is predetermined for each of combinations of predetermined specific marks.

According to still another embodiment of this invention, moreover, a replacement detection key instructs, by the presence of the replacement detection key, that different pasting processing be carried out depending on whether or not a specific comparison object agrees with comparison conditions, or instructs, by the presence of the replacement detection key, that the description of a template be pasted in the description of another template.

The program storage medium of this invention is a program storage medium in which a program for implementing the aforementioned manuscript text composition system is stored.

The manuscript text composition system of this invention is capable of using the contents of parameters in terms of a plurality of coordinates by preparing templates having a description to carry out replacement using replacement detection keys, and describing various parameters to be used in the templates in a parameter table having multi-dimensional coordinates. The manuscript text composition system of this invention is capable of carrying out more complicated processing, including replacement upon checking conditions, for example, rather than simple replacement, by giving a replacement detection key itself a meaning corresponding to a specific processing or a meaning for more specific processing by adding a tag or extension.

According to this invention, furthermore, the manuscript text composition system can be implemented by using a program for operating a computer in the aforementioned manner, and this program can be stored in various appropriate program storage medium.

BRIEF DESCRIPTION OF DRAWINGS

FIG. 1 is a diagram of assistance in explaining the operating principle of this invention.

FIG. 5 shows an example of the parameter table.

FIG. 6 is a diagram of assistance in explaining an example where a template can be specified using a cell specifying replacement detection key.

FIG. 7 is a diagram of assistance in explaining an example where the relative position of a replacement detection key is specified.

FIG. 8 is a diagram illustrating the manner in which a replacement detection key is specified.

FIG. 9 is a diagram giving a summary of description on marks being used.

FIG. 10 is a diagram giving a summary of various modes of normal replacement instructions.

FIG. 11 is a diagram of assistance in explaining the processing conducted after the number of versions of a file has been managed.

FIG. 12 is a diagram of assistance in explaining the manner in which repetition control is carried out.

FIG. 13 is a diagram of assistance in explaining replacement control where the replacement detection key is made invalid or valid.

FIG. 14 is a diagram in explaining template fetch processing.

FIG. 15 is a diagram in explaining the state of the processing conducted after the number of versions of a file has been managed as described in FIG. 11.

FIG. 17 is a diagram of assistance in explaining the manner in which a plurality of templates are specified.

FIG. 18 is a diagram of assistance in explaining the manner in which replacement is carried out after conditions for a comparison object have been checked.

FIG. 19 shows a flow chart of the processing shown in FIG. 18.

DESCRIPTION OF THE PREFERRED EMBODIMENTS

Figure 2:
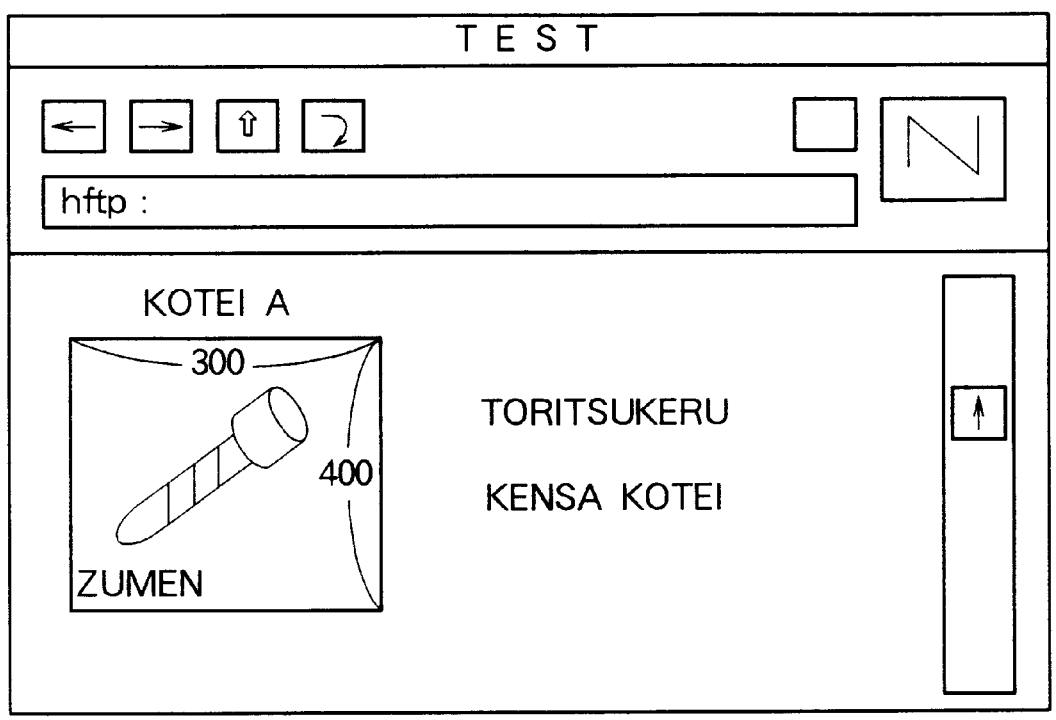
FIG. 2 shows a manuscript text displayed based the translated template contents shown in FIG. 1.

FIG. 1 is a diagram of assistance in explaining the operating principle of this invention. In the figure, reference numeral 1 refers to a parameter table, 2 to a template, and 3 to translated template contents, respectively.

In this invention, a tool for easily creating hyper text markup language (HTML) based on the output data (in CSV format) of a spreadsheet program, for example, is given.

This tool, that is, a manuscript text composition system is implemented using a program that operates a computer in the following manner. This program stores various program storage media suited for storing it.

More detailed description will be given again separately, referring to FIG. 1. Now assume that "Format 1.txt" shown in the figure is given as one of the template 2, and parameters relating to "Format 1.txt" are described in the second row, for example, of the parameter table 1 shown in the figure.

In this case,
(i) since data "Kotei A" are described in column "B" in the second row of the parameter table 1, corresponding to the position described as "@B@" in the third row of "Format 1.txt," data "Kotei A" are substituted in the third row of the translated template contents 3 for "@B@" given above, and
(ii) "Zumen 1" "300" and "400" are substituted in the fourth row of the translated template contents 3 for the positions described as "@C@" "@B1@" and "@C1@" in the fourth row of"Format 1.txt."

This is attributed to that data "Zumen 1" are described in "Column C and 2nd Row," data "300" are in "Column B and 1st Row", and data "400" are in "Column C of 1st Row" of the parameter table 1.

One cell (coordinate position C2) in the parameter table 1 is specified with only "C," as in "@C@" above, when the row position of that cell is known in advance (it is known in the above example that "Format 1.txt" whose parameters are described in the second row is being processed). One cell is specified with a coordinate value of "C1" as in "@C1@" when the row position of that cell is different from the row now being processed.

In this invention where the template 2 is translated using the parameter table 1, what is expressed by two specific marks, such as "@ - - - @" above, is termed a "replacement detection key."

In the translated template contents 3 shown in FIG. 1, symbols used have the following meanings:

(a) <HTML> - - - </HTML>: Denotes the start and end of a document.

(b) <TITLE> - - - </TITLE>: Denotes that " - - - " in between is displayed as a title on top of the screen.

(c) <HR>: Denotes that a horizontal line is drawn after line feed.

(d) <BR>: Denotes line feed.

(e) <A NAME= - - - > - - - </A>: Denotes the name of an anchor. Also denotes the name of a jump address expressed by <A HREF=# - - - > - - - </A>, which will be described later.

(f) <IMG SRC=* - - - >: Denotes that a graphic in file * is pasted.

(g) ALIGN="left": Denotes that something is pasted on the left.

(h) WIDTH=* or HEIGHT=*: denotes that the width is * or the height is *.

(i) <FONT COLOR= - - - > - - - </FONT>: Denotes that characters being displayed are displayed in " - - - " color.

(j) <A HREF=# - - - > - - - </A>: Denotes linkage (jump) to a location specified by " - - - ".

Based on these definitions, the translated template contents 3 shown in FIG. 1 mean that (i) it is a manuscript written in HTML, (ii) its title is "TEST,"

(iii) a horizontal line is drawn under the title followed by line feed, and its anchor name is "Kotei A.", followed by line feed, (iv) A graphic form gif in File "Zumen 1" of a width of 300 and height of 400 is pasted on the left, (v) character "Toritsukeru" is described in black color followed by line feed, (vi) the jump address is "Kensa Kotei", (vii) line feed, and (viii) end of a document.

FIG. 2 shows a manuscript text displayed based on the translated template contents shown in FIG. 1.

As described above, title "TEST" is displayed, anchor name "Kotei A" is displayed, the graphic form gif, a screw, for example in file "Zumen 1" is displayed at a desired location in a desired size, and character "Toritsukeru" is displayed in black color. The jump address, to which processing is advanced when its position is clicked with a mouse, is displayed as "Kensa Kotei".

Figure 3:
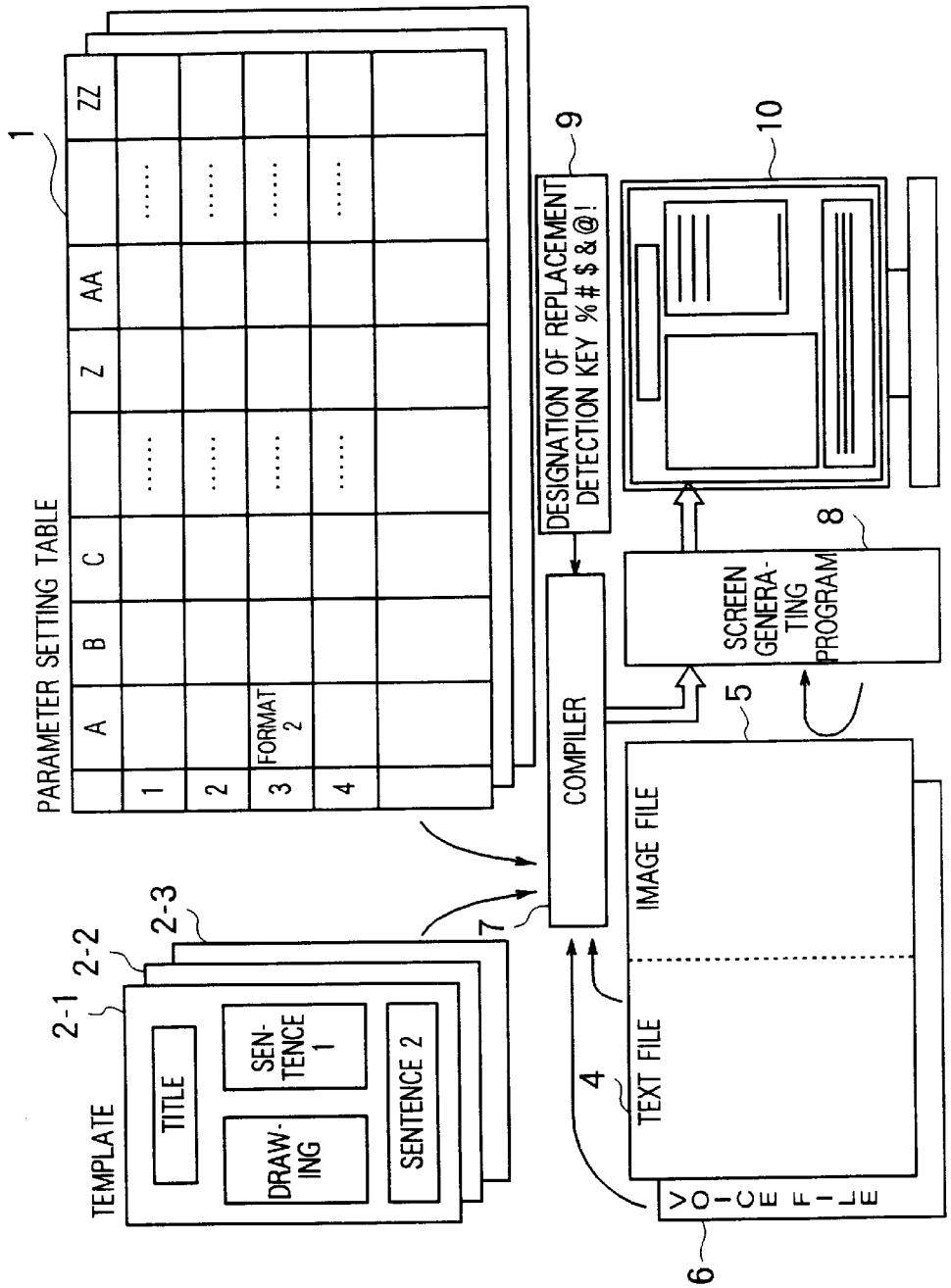
FIG. 3 is a diagram showing the configuration of a system embodying this invention.

FIG. 3 is a diagram of assistance in explaining the configuration of a system embodying this invention. In the figure, numerals 1 and 2 correspond to like numerals in FIG. 1. The parameter table is constructed in three dimensions, for example, the template 2 has a plurality of templates 2-1, 2-2, 2-3, - - - .

Numeral 4 in the figure refers to a text file in which individual files specified by the aforementioned replacement detection keys are stored. Similarly, numeral 5 refers to an image file in which individual files specified by the replacement detection keys are stored, and numeral 6 refers to a voice file in which individual pieces of voice information specified by the replacement detection keys are stored.

Numeral 7 refers to a compiler for creating a screen generating program based on the contents of a specific template 2-i, the parameter table 1, the text file 4 and/or the image file 5 and/or the voice file 6 to be used as necessary. Numeral 8 refers to a screen generating program compiled by the compiler 7 so as to display screens in HTML, for example. Numeral 9 refers to a replacement detection key designating section for which the operator specifies at the time of startup that predetermined marks, such as %, #, - - - are used as replacement detection keys used in this invention. (Those marks that were once designated as the replacement detection keys can of course be canceled later.)

Numeral 10 refers to a terminal unit, including a display.

In terms of image, a template 2-i represents a full page of text since "Title" is described at the topmost, a specific "Chart" at the left top, a specific "Sentence 1" at the right top, a specific "Sentence 2" at the lower part of the template 2-i, respectively. In practice, however, a template 2-i is provided using a description shown as "Format 1.txt" in FIG. 1, rather than an image representation.

Now assume that the template 2-i corresponds with "Format 2" and parameters relating to "Format 2" are described in the third row of the parameter table 1.

As a result of search of column A of the parameter table 1, a description on "Format 2" is found in the third row. This means that the third row is a row in which parameters relating to "Format 2" are described. As it is found out that "Format 2" is the name of a desired template, the manuscript of that template is read.

To display an image corresponding to "Format 2" on the display of the terminal unit 10, the compiler 7 generates a screen generating program 8 using a template 2-i (corresponding to Format 2), the contents of the parameter table 1, and the contents of any specific file supposed to be described in a "cell" of the parameter table 1 (it is assumed that the name of a specific text file and/or the name of an image file and/or the name of a voice file are described in the cell). The screen generating program 8 fetches the contents each of the text file 4 and/or the image file 5 and/or the voice file 6, as necessary, to display them on the display of the terminal unit 10.

The manuscript text composition system of this invention, including the manuscript text composition system shown in FIG. 3, is implemented using a program for operating the computer, as described in the aforementioned description and a description which will be made in reference to the processing flow chart given below. This program is stored in various program storage media suitable for storing it.

Figure 4:
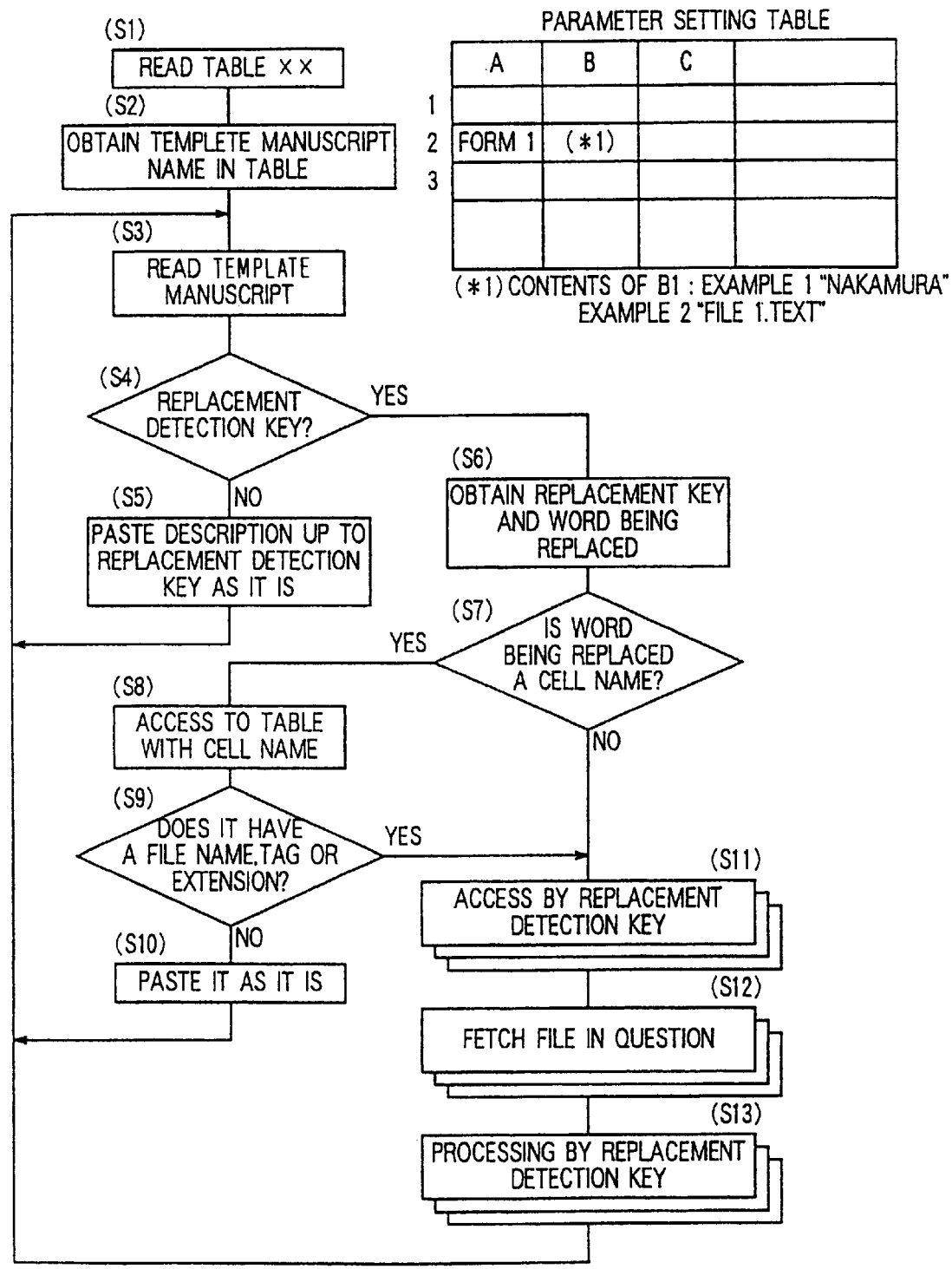
FIG. 4 shows a processing flow chart.

FIG. 4 is a processing flow chart. Numeral 1 in FIG. 4 denotes a parameter table.

Now, let us take a simple example to facilitate the understanding of description, and assume that (i) template 2-i corresponds to a specific template Form 1, where there is a description that "Konnichiwa, %B2%/san, genki desuka" (Good day, %B%-san, how are you?)

where "% - - - %" is a replacement detection key.

(ii) parameters for Form 1 are described in the second row of the parameter table 1, and "Nakamura" is described as (Example 1) in the cell represented by the coordinate value of (B2), and "File.txt" is described as (Example 2).

First, the case of (Example 1) will be described.

Step (S1): Assuming that the second row in the parameter table 1 is to be processed, the second row is read.

Step (S2): From the fact that "Form 1" is found described in a cell (coordinate position A2) of column A in the second row from which parameters were read in the parameter table 1, it is known that the corresponding template is "Form 1."

Step (S3): Template "Form 1" is read. In this example, it is known that "Konnichiwa, %B2%-san, genki desuka" is described in template "Form 1," as shown above.

Step (S4): Each word of the description is checked sequentially from "Kon" to "nichi" and "wa" - - - , to see if each word is a replacement detection key.

Step (S5): Since the portion of description up to "Konnichiwa" has no replacement detection key, "Konnichiwa" is pasted as it is in the processing stage of Step (S5) at the moment.

In the processing flow chart shown in FIG. 4, the processing is returned to Step (S3) again, where "%B2%" is read at this moment.

Step (S4): YES is selected. Then, the processing proceeds to Step (S6).

Step (S6): Replacement detection key "% - - - %" and replacement word "B2" are obtained.

Step (S7): Since the replacement word is "B2," it is known that it indicates a "cell name," and YES is selected.

Step (S8): With a cell name ("B2" in this case), access is made to the corresponding cell in the parameter table 1.

Step (S9): Since the contents of the corresponding cell are "Nakamura" in this example (and since it has no tag or extension), NO is selected. Tags and extensions will be described later.

Step (S10): The contents of the cell, "Nakamura", are pasted as they are.

Thus, the processing up to "Konnichiwa, Nakamura" has been completed.

Then, the processing is returned to Step (B3) to check sequentially each word from "sa", to "n", ",", "gen", "ki", "de", "su" and "ka". The processing further proceeds to Step (S4) and Step (S5) to create a manuscript text reading "Konnichiwa, Nakamura-san, genki desuka" (Good day, Nakamura-san, how are you?)

Next, (Example 2) above will be described.

Step (S1): Assuming that the second row in the parameter table 1 is to be processed, the second row is read.

Step (S2): From the fact that "Form 1" is described in a cell of column A in the second row from which parameters were read in the parameter table 1, it is known that the corresponding template is "Form 1."

Step (S3): Template "Form 1" is read. In this example, it is known that "Konnichiwa, %B2%-san, genki desuka" is described in template "Form 1," as shown above.

Step (S4): Each word of the description is checked sequentially from "Kon" to "nichi", "wa" - - - , to see if each word is a replacement detection key.

Step (S5): Since the portion of description up to "Konnichiwa" has no replacement detection key, "Konnichiwa" is pasted as it is in the processing stage of Step (S5) at the moment.

In the processing flow chart shown in FIG. 4, the processing is returned to Step (S3) again, where "%B2%" is read at this moment.

Step (S4): YES is selected. Then, the processing proceeds to Step (S6).

Step (S6): Replacement detection key "% - - - %" and replacement word "B2" are obtained.

Step (S7): Since the replacement word is "B2," it is known that it designates "cell name," and YES is selected.

Step (S8): With a cell name, access is made to the parameter table.

Step (S9): Since the contents of cell "B2" are "File 1.txt" in this example, YES is selected.

Step (S11): The processing proceeds to access by replacement detection key. Since the replacement key is "% - - - %" in this case, the processing corresponding to this replacement detection key is started. (Access by replacement detection key will be described later.)

Step (S12): The file designated by replacement word "File 1.txt," that is, "File 1" is fetched. It is assumed here that the text of the File 1 file has a description of "Okinawa-shusshin no Nakamura" (Nakamura from Okinawa).

Step (S13): In this example, the processing of pasting "Okinawa-shusshin no Nakamura" above is conducted. As a result, the processing up to this moment brings about the text up to "Konnichiwa, Okinawa-shusshin no Nakamura-san" (Good day, Nakamura-san from Okinawa).

Then, the processing is returned to Step (S3), and part of the text up to "sa", "n", ",", "gen", "ki", "de", "su", and "ka" is sequentially processed in Step (S4) to Step (S5), and a manuscript text of "Konnichiwa, Okinawa-shusshin no Nakamura-san, genki desuka" (Good day, Nakamura-san from Okinawa, how are your?) is created.

In this invention, various manuscript texts can be created from one template by using a parameter table 1 and giving predetermined descriptions in desired cells, as described above. This can of course be implemented merely by rewriting the contents of "cells".

This invention, which is originally based on using the contents of cells, allows the "File 1.txt" specified by the contents of the aforementioned Cell B2, such as "Konnichiwa, %File 1.txt%/san, genki desuka", to be described directly in the description of the template 2-i. In this case, needless to say, NO is selected in Step (S7) shown in FIG. 7 when %File 1.txt% has been found out, and the processing proceeds to Step (S11).

FIG. 5 shows an example of parameter table. In the figure, one cell is shown as specified by two-dimensional coordinates.

In column A, column B, column C, - - - in the parameter table 1 shown in the figure, described are;

Column A: Command or template name ("Command"is supposed to include "Conditional Expression.")

Column B: Process name

Column C: Graphic data name (file name)

Column D: text of work description

Column E: text of precautions

Column F: Next process name (jump address)

.

.

.

and a predetermined allocation is carried out for each of them. Each row, such as the first row, the second row, - - - , is shown as corresponding to each template. In the figure, for example, the second row gives parameters corresponding to template "Form 1."

In this way, the contents of a description in each cell can be designated in terms of template name (that is, coordinates in the row), and in terms of process name, graphic data name, etc. (that is, coordinates in the column) by predetermining rows and columns at the startup of the system.

Now, assume that the contents of cell "D2" in template "Form 1" are changed from "Uegawa kara shimeru" (Tighten the screw from above) to "oko kara shimeru" (Tighten the screw from the side), for example. In this case, if the description of "Yoko kara shimeru" exists in the corresponding parameters of the template "Form 10" in the third row in the figure, the description of "Uegawa kara shimeru" in Cell "D2" is replaced with "Refer to one cell below D2." This permits only the parameter "text of work description" in Form 1 to be replaced with "Yoko kara shimeru".

In this case, the fact that the description of "Yoko kara shimeru" itself exists at the location of "text of work description," that is, coordinate "D3" in the Form 10 row can be known only if the operator remembers that "Yoko kara shimeru" is described in the template name of "Form 10."

In this way, the advantage of the parameter table having a multiple-dimensional coordinate system can be fully utilized with increases in the contents of description in the parameter table.

Although one row is supposed to correspond to one template in the description given above, it is needless to say that this is simply a standard form which permits a plurality of rows to be related to one template. In place of the above-mentioned standard form, parameters necessary for command name "GTT" can be described arbitrarily, as shown by "Graphic," "Text A" or "Text B" in the sixth row of FIG. 5, independently of the designation of the contents of rows, such as "Process Name," "Graphic Data Name (File Name)", - - - in the figure.

FIG. 6 is a diagram of assistance in explaining an example where the contents of a cell can be designated by a replacement detection key for designating a cell.

What kind of marks can be used as replacement detection keys will be described later. Now assume that there exists a replacement detection key such as

"~@Z3@~"

in a description in a template. "~" denotes a description which includes no replacement keys, such as "Konnichiwa" or "san, genki desuka," as described in reference to FIG. 4, while "@- - - @" denotes a mark representing a replacement detection key.

If there exists

"~@Z3@~"

it designates that the contents of a cell having coordinate (Z3) are replaced. In the example shown in FIG. 6, if "asahi" (in Example ①), for example, is described in a cell (coordinate Z3) in the parameter table 1, the result of replacing the above description

"~@Z3@~"

will be

"asahi."

If "B5" (in Example ②) is described in cell (coordinate Z3), it means that the contents of a cell (coordinate B5) are to be used. Since the contents of cell (coordinate B5) are described as "yuhi," the replacement result will be "~yuhi~"

as shown in Example ② in the figure.

The contents of individual cells have various types, such as a type where the contents themselves of a cell ("asahi" in this case) are replaced, as in Example ①, a type where the contents of the cell indicate the coordinate of another cell ("B5" in this case), as in Example ②, a type where a text name (Text name "TITLE.txt" in this case) is described to indicate that the contents of the text called "TITLE.txt" are used for replacement, as in Example ③, and a type where a command name (or a conditional expression name) (Command name "-FILE. class" in this case) is described to indicate that command "-FILE. class" is executed prior to replacement, and the execution result is replaced (in the case of conditional expression, check is made to see if the conditional expression is satisfied, and the check result is used for replacement), as in Example ④.

FIG. 7 is a diagram of assistance in explaining an example where the relative position of a cell is designated.

When "~@Z3@~" is described, as in the example shown in FIG. 6, it is indicated that the contents of cell (coordinate Z3) are used. Taking advantage of this, another cell can be designated by indicating its relative coordinate position from cell (coordinate Z3).

When there exists a description of

"~@Z3+@~"

as shown in FIG. 7, a cell located in the same column of the next row, viewed from cell (coordinate Z3), that is, a cell of coordinate Z4, is designated. In terms of the example of the parameter table 1 shown in FIG. 6, the contents of "○" in cell (coordinate Z4) are used for replacement.

When there exists a description of

"~@Z3-@~", as shown in FIG. 7, a cell located in the same column of one row preceding cell (coordinate Z3), that is, cell (coordinate Z2), is designated. In terms of the example of the parameter table 1 shown in FIG. 6, the contents of "Δ" in cell (coordinate Z2) are used for replacement.

FIG. 8 is a diagram illustrating the manner in which the replacement detection key is specified.

What mark is used as a replacement detection key is specified at the startup of the system by the replacement detection key designating section 9 shown in FIG. 3.

"@ - - - @" shown in FIG. 8 indicates that the contents of " - - - " between @ are replaced as a replacement detection key. If designated appropriately in advance in replacing the same contents of " - - - " as a key, "% - - - %" in FIG. 8 can also be used.

The replacement detection key uses the same marks of @ or % before and after the contents to be replaced, as in "@ - - - @" or "% - - - %", and the type of processing can be specified using different marks. That is, "! - - - !" shown in FIG. 8 means that the contents of " - - - " are a file name, and the file having that file name is replaced with the latest of the updated file, if it has an updating history.

A pair of different marks can be used before and after the contents, as in "! - - - %" or "# - - - %" shown in FIG. 8. "% - - - !%" shown in FIG. 8 can be used when a mark that has been designated in advance as a replacement detection key, "!", for example, is used for other purposes than the replacement detection key by nullifying the mark "!". "%+!%" shown in FIG. 8 is for specifying that the mark "!" that has once been nullified as the replacement detection key is used again as a replacement detection key.

FIG. 9 is a diagram summarizing the description of marks to be used.

a) The replacement detection key normally uses the same marks before and after the contents, as in "% - - - %" or "# - - - #".

b) A pair of different marks may be used before and after the contents, as in "% - - - #" or "@ - - - %".

c) Combinations of different types of marks can be used, as in "%- - - - %" or "%+ - - - %" or "%! - - - %".

d) Combinations of a plurality of the same marks can be used, as in "%% - - - %%" or "%% - - - %" or "% - - - %%".

These marks to be used and the meanings thereof are designated by the replacement detection key designating section 9 shown in FIG. 3, as described above.

FIG. 10 is a diagram illustrating various forms of the normal replacement instruction. In the figure, "% - - - %" denotes the normal replacement instruction.

a) "~%B%~": The contents of column B in the parameter table are inserted at the time of replacement.
b) "~%B1%~": The contents of a cell (coordinate B1) in the parameter table are inserted at the time of replacement.
c) "~%B1:C2%~": The contents of cells enclosed by a rectangle defined by a cell (coordinate B1) in the parameter table as the left top corner and a cell (coordinate C2) as the right bottom corner are inserted at the time of replacement.
d) "~%file.txt%~": The content of a file having a file name of "file.txt" are used at the time of replacement.
e) "~%<B1:C2>file.csv~": The contents of cells enclosed by a rectangle defined by a cell (coordinate B1) in a parameter table having a table name of "file.csv" as the left top corner and a cell (coordinate C2) as the right bottom corner are inserted at the time of replacement.
f) "~%<OL TYPE=1>file.txt%~": The contents of a file having a file name of "file.txt" are converted in a format specified by " - - - " (in this example, "OL TYPE=1") in < - - - >, and inserted at the time of replacement.
g) "~%*.txt%~": The contents of a wild-card text file having an extension of ".txt", whose file name is not specified, are inserted at the time of replacement.
h) "~%*abc.txt%~": The contents of a text file having a file name prefixed by "abc" and having an extension of ".txt" are inserted at the time of replacement.

In the following, various processing forms using the replacement detection keys will be described.

FIG. 11 is a diagram of assistance in explaining the processing conducted after the number of file versions has been managed. In the manner of processing shown in FIG. 11, a file being pasted is determined after candidate files being pasted are retrieved and checked for the number of their versions generated to compare with the scheduled date for compiling.

a) "~+ - - - +~": If there is a file of one version newer than the current one (the scheduled date for compiling—the same applies hereinafter), it is selected as a file being pasted.
b) "~+ - - - %~": The file of the latest version is selected as a file being pasted.
c) "~— - - - —~": If there is a file one version older than the current one, it is selected as a file being pasted.
d) "~— - - - %~": The file of the first version will be pasted.
e) "~+ - - - —~": If there is any different version for the file designated by " - - - ", it is inserted at the time of replacement, with its display color changed.

FIG. 12 is a diagram of assistance in explaining the manner in which repetition control is conducted. In the manner shown in FIG. 12, if there are a plurality of data being inserted for a certain template, replacement processing is repeated by that number.

a) "~! - - - % - - - % - - - !": The processing designated by " - - - " in "! - - - !" is repeated by the number of data or the number of continuation rows designated by " - - - " in "% - - - %".

That is, assuming that
"~!<A NAME=%<B1:B3>%!~"
is described as a template, the contents of cell (coordinate B1) in the parameter table 1 are "AAA", the contents of cell (coordinate B2) are "BBB", and the contents of cell (coordinate B3) are "CCC", then, the processing is repeated three times as follows.

<A NAME=AAA>
<A NAME=BBB>
<A NAME=CCC>

FIG. 13 is a diagram of assistance in explaining replacement control for making a replacement detection key invalid or valid. In the manner shown in FIG. 13, a mark that has once been designated as a replacement detection key is made invalid in the subsequent processing, or a mark that has once been made invalid is made valid in the subsequent processing (the same as the case shown in FIG. 8).

a) "~%-!%~": If this replacement detection key exists, the marks ! appearing in the subsequent processing are made invalid as one of the replacement detection keys.
b) "~%+!%~": If this replacement detection key exists, the marks ! that have once been made invalid as the replacement detection keys are made valid again as one of the replacement detection keys in the subsequent processing.

FIG. 14 is a diagram of assistance in explaining template fetch processing.

To avoid having too many templates, this processing makes it possible to fetch an alternative template in a current template so as to use the contents of the alternative one that are similar in functions to the contents of the current one.

a) "~%# - - - %~": A description is given in the name of an alternative template being fetched in " - - - " of "# - - - " so as to fetch the contents of the alternative template in the contents of a current template.

If there exists a description of
"~ - - - %#hina1% - - - ~"
in part of the contents of a current template, for example, and if the template "hina1" has a description of
"~ - - - %B1%~%C2% - - - ~".
processing is conducted on the assumption that part of the contents of the current template also has the contents of
"~ - - - %B1%~%C2% - - - ~".

FIG. 15 is a diagram of assistance of explaining the state of processing corresponding to the processing after the number of versions has been controlled, as shown in FIG. 11. In the figure, numeral 5 refers to an image file shown in FIG. 3, in which there exists a graphic identified by the name of "file 1.gif". Now, assume that the first version (no. of versions: 01) of the graphic was prepared on Apr. 14, 1996, the second version (no. of versions: 02) on Apr. 18, 1996, the third version (no. of versions: 03) on May 3, 1996, the fourth version (no. of versions: 04) on May 4, 1996, the fifth version (no. of versions: 05) on May 11, 1996, and the latest version (no. of versions: 06) on May 13, 1996, respectively.

Numeral 10 refers to a terminal unit shown in FIG. 3.

Assume that a description of
"~%file1.gif%~"
is given in a certain template to use a specific file "file1.gif" as described above. In this case, if the replacement detection key of "% - - - %" indicates simply replacing " - - - ", and replacement is conducted on the reference date of May 3, 1996, for example, then, a graphic Q shown in FIG. 15 is pasted.

If a description of
"~+file1.gif+~"
is given in that template, check is made to see if there exists any file one version newer than the third version based on the reference date of May 3, 1996. If any, the fourth version, that is, a graphic R shown in the figure that was prepared on May 4, 1996, is pasted. The display image shown on the terminal unit 10 in FIG. 15 schematically represents the state where the graphic R of the fourth version was pasted.

If a description of

"~–file1.gif–~"

is given in the template, check is made to see if there exists any file one version older than the third version based on the reference date of May 3, 1996. If any, the second version, that is, a graphic P shown in the figure that was prepared on Apr. 18, 1996 is pasted.

Figure 16:
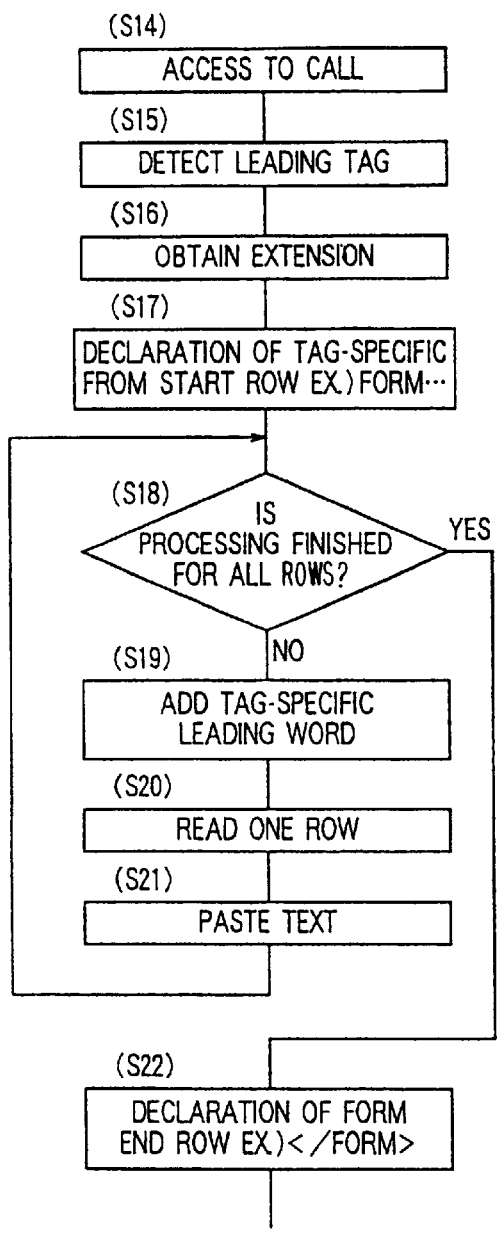
FIG. 16 is a diagram of assistance in explaining the pasting processing conducted after data has been processed by detecting the existence of a tag.

FIG. 16 is a diagram of assistance in explaining the pasting processing after the existence of a tag has been detected and the relevant data has been processed.

Now, assume that the contents of a certain template instructs to refer to a cell of coordinate (K3), for example, in the parameter table 1. A description of OL TYPE=<OL TYPE 1>file1.txt is given in the cell, and a description of

<FORM>
<OL TYPE1>
<L1>DATA1
<L1>DATA2
<L1>DATA3
</FORM> is given in a file designated by "file1".

Step (S14): Cell (coordinate K3) is accessed, as stated in the above assumption.

Step (S15): The existence of the leading tag given by < - - - > in the contents of the cell is detected.

Step (S16): Next, the existence of the extension given by ".txt" is detected.

Step (S17): Since there exists a description of "file1.txt" in the contents of cell (coordinate K3), a file designated by "file1" is accessed, and the contents of files shown as examples at the right top of FIG. 16 are sequentially read one by one. This will be described in detail later, referring to FIG. 4. Now, the processing proceeds to Step (S11) shown in FIG. 4, entering 1 of tag-wise processing.

In tag-wise processing, <OL TYPE1>, for example, instructs preparation of a table describing each data by adding numbers "1", "2" and "3" to the head of DATA1, DATA2 and DATA3, as shown in Table L shown at the right bottom of FIG. 16.

<CHECK BOX> instructs preparation of a table describing each data by adding small squares □ to the head of each data, as shown in Table M at the right bottom of FIG. 16.

Furthermore, <RADIO> instructs preparation of a table describing each data by adding small white circles ○ at the head of each data, as in Table N shown at the right bottom of FIG. 16.

Step (S18): <FORM>, <OL TYPE1> - - - are sequentially read from file "file1", and <LI>DATA is also read. In this case, NO is selected because it is not the end of all rows. If YES is selected, the processing proceeds to Step (S22), resulting in the end of Form.

Step (S19): Preparation is made for adding a tag-wise leading word, that is, numeral "1" in this case, to the head of DATA1, and numeral "1" is added.

Step (S20): DATA1 is read.

Step (S21): Obtain "1 DATA1", and the text is pasted. Then, return to Step (S18).

The processing proceeds in the following manner.

The processing goes to Step (18), Step (S19), Step (S20), and Step (S21), and "2 DATA2" is pasted. And then, the processing repeats the cycle of Step (S18), Step (S19), Step (S20), and Step (S21), and "3 DATA3" is pasted. Finally, the processing goes to Step (S22).

In the case of the aforementioned <CHECK BOX>,

□ DATA1
□ DATA2
□ DATA3 are pasted. In the case of <RADIO>,

○ DATA1
○ DATA2
○ DATA3 are pasted. Small squares with diagonals, and double circles shown in FIG. 16 are the marks added appropriately to predetermined data.

FIG. 17 is a diagram of assistance in explaining the manner in which a plurality of templates are specified. In the parameter table 1 shown in FIGS. 1, 3 through 5, the column in which the name of template is described in a given horizontal row is defined as column A, so that the existence of a template name can be checked merely by searching the predetermined column A in the parameter table 1.

Even different templates, however, may have the same parameters for instructing replacement processing with a replacement detection key. Take as a simple example "Format 1" that is a template. "Format 1" has a description of "Konnichiwa%C%san, genki desuka", and the contents of cell C is "Nakamura". In "Format 2" as another template, on the other hand, has a description of "%C%san, omedeto" (%C%san, congratulations), and the contents of cell C is "Nakamura".

If there exist "Format 1" and "Format 2", and both "Format 1" and "Format 2" are processed in the manner shown in FIGS. 1 and 3 through 5 as described above, parameters for "Format 1" have to be pasted in a horizontal row in the parameter table 1, while parameters for "Format 2" in another horizontal row. In the most complicated case, the same contents of "Nakamura" would have to be described in cell C in each of the horizontal rows. When "Nakamura" is changed to "Tanaka", for example, the contents of cell C in each of the horizontal rows would have to be rewritten separately to "Tanaka".

In the example shown in FIG. 17, the contents of a certain cell, cell C, for example, are used in common to output separate sentences. That is, an expression of "template identification mark+template name+separation symbol+output destination name"

is used as the rule for this processing, and two or more of this expression are described in cells in the same horizontal row of the parameter table 1.

Now, assume that mark "!" is used as the template identification mark, "Format 1" as the template name, and ":" as the separation symbol, respectively. To output data by setting the output destination name as "Sentence 1", the above expression will be "!Format 1: Sentence 1".

Similarly, the above expression for outputting data by setting the output destination name as "Sentence 2" using "Format 2" will be "!Format 2:Sentence 2".

If the contents of template "Format 1" are

"Konnichiwa%C%san, genki desuka", and the contents of template "Format 2" are

"%C%san, omedeto", then,

"!Format 1: Sentence 1"

is described in an appropriate cell (A) in a horizontal row of the parameter table 1, "!Format 2: Sentence 2"
is described in an appropriate cell (B), and "Nakamura" is described in cell C, as shown in FIG. 17.

With this expression, when the parameter table 1 is read in Step (S1), as shown in the flow chart in FIG. 4 above, "!Format 1: Sentence 1" and "!Format 2: Sentence 2"
are found out, and templates "Format 1" and "Format 2" are obtained, as in Step (S2), and "Konnichiwa%C%san, genki desuka" for Format 1 and
"%C%san, omedeto" for Format 2
are found out. At this time, the contents of cell (C), "Nakamura", are pasted, as described above, and "Konnichiwa Nakamura san, genki desuka" for Sentence 1 and "Nakamura san, omedeto" for Sentence 2
are output to two separate output destinations. In this case, if the contents of cell (C) above are changed to "Tanaka", "Nakamura" in Sentences 1 and 2 above is changed to "Tanaka".

FIG. 18 is a diagram of assistance in explaining the manner in which replacement is conducted after conditions for comparison have been checked.

In outputting a desired sentence, it is desired that if an object agrees with certain conditions (if it is true), a first sentence should be output, and if the object does not agree with the conditions (if it is false), a second sentence should be output.

The example shown in FIG. 18 is to meet such a demand. That is, an expression of "%comparison column="condition value": true replacement column: false replacement column%"

is used as the rule for processing.

Now, assume that i. template name "Form 10" is described in column A, "Kotei 1" in column B, no description is given in column C, and "Basho 1" is described in column D of the first horizontal row, ii. no description is given in columns A, B and C, "Basho 2" is described in column D of the 2nd horizontal row, iii. no description is given in column A, "Kotei 3" is described in column B, no description is given in column C, and "Basho 3" is described in column D of the third horizontal row, and iv. no description is given in column A, "Kotei 4" is described in column B, no description is given in columns C and D of the fourth horizontal row in the parameter table 1, as shown in FIG. 18.

The terms used in the above rule have the following meanings:

Comparison row: Row being compared and judged

"Condition value": Strings for comparing with the contents of a comparison row

True replacement column: Column in which strings of characters to be replaced when the result of comparison between a comparison column and the condition value is true (equal) are registered.

False replacement column: Column in which strings to be replaced when the result of comparison between a comparison column and the condition value is false (not equal) are registered. As described in reference to FIG. 7 above, descriptions may include replacement columns suffixed by + or −.

Replacement column + (Ex.: D+): To be replaced by the contents of the replacement column in the next row (Ex.: column D). If the replacement column is in the final row, it is replaced by the contents of the replacement column in the leading row (Ex.: column D).

Replacement column − (Ex.: B−): To be replaced by the contents of the replacement column in the preceding row (Ex.: column B). If the replacement column is in the leading row, it is replaced by the contents of the replacement column in the leading row (Ex.: column B).

In the above example, assume that a description of

"Kyo no shigoto wa %B=" ": B−:B% de okonai, Basho wa %D=" ": D+:D% desu"

is given in a template.

In the first row in the parameter table 1, (a) column B is false because it is not equal to empty (non-description), and therefore the contents of column B, that is, "Kotei 1" is replaced, and (b) column D is false because it is not equal to empty (non-description), and therefore the contents of column D, that is, "Basho 1" is replaced.

In the second row in the parameter table 1, (c) column B is true because it is equal to empty (non-description), and therefore the contents of cell "B−", that is, "Kotei 1" is replaced, and (d) column D is false because it is not equal to empty (non-description), and therefore the contents of cell "D", that is, "Basho 2" is replaced.

In the third row in the parameter table 1, (e) column B is false, and "Kotei 3" is replaced, and (f) column D is false, and "Basho 3" is replaced.

In the fourth row in the parameter table 1, (g) column B is false, and "Kotei 4" is replaced, and (h) column D is true, and the contents of cell "D+", that is, "Basho 1" is replaced.

As shown in FIG. 18, from the above results, the first row becomes

"Kyo no shigoto wa "Kotei 1" de okonai, basho wa "Basho 1" desu".

(Today's work will be performed in accordance with "Process 1", and the site of work is "Site 1".)

The second row becomes

"Kyo no shigoto wa "Kotei 1" de okonai, basho wa "Basho 2" desu".

(Today's work will be performed in accordance with "Process 1", and the site of work is "Site 2".)

The third row becomes

"Kyo no shigoto wa "Kotei 3" de okonai, basho wa "Basho 3" desu".

(Today's work will be performed in accordance with "Process 3", and the site of work is "Site 3".)

The fourth row becomes

"Kyo no shigoto wa "Kotei 4" de okonai, basho wa "Basho 1" desu".

(Today's work will be performed in accordance with "Process 4", and the site of work is "Site 1".)

FIG. 19 shows the flow chart of processing shown in FIG. 18.

Step (S23): Input data in one row of the parameter table 1.

Step (S24): Check to see if the data is described. If the data is not described, the processing is ended.

Step (S25): Check to see if the row in question has any template designation.

Step (S26): If any, input that template.

Step (S27): Retrieve cells in that row.

Step (S28): Check to see if there are any corresponding cells.

Step (S29): Fetch the value of the cell being judged.

Step (S30): Compare the fetched cell value with the condition value.

Step (S31): Check to see if the comparison result is true or false.

Step (S32): If true, fetch the true replacement column.

Step (S33): If false, fetch the false replacement column.

Step (S34): Check to see if the column in question has a + or − symbol.

Step (S35): Check to see if the mark is + or −.

Step (S36): Check to see if the current row is the final row.

Step (S37): Check to see if the current row is the leading row.

Step (S38): Replace with the cell value in the next row.

Step (S39): Replace with the cell value in the leading row.

Step (S40): Replace with the cell value in the leading row.

Step (S41): Replace with the cell value in the preceding row.

Step (S42): Replace with the cell value in the current row.

In this invention, the contents of a cell is checked in Step (S9) to see if the contents have a file name, etc., or a tag or extension. Based on the check results, various types of access processing are conducted in Step (S11), according to the replacement detection keys.

Various types of processing as described in reference to FIGS. 10 through 19 above are performed in Steps (S12) through (S13) after classifying them into various types of corresponding access processing in Step (S11), except for simple replacement processing, such as "~@@~" or "~%%~".

In connection with this, tags and extensions in HTML language will be outlined in the following, though they have already been described briefly in relation to the translated template contents 3 shown in FIG. 1.

As is well known, HTML language is a language to allow a WWW browser to display information on the computer screen.

Tags are used in HTML language to define the rules for displaying information, usually described by enclosing a character or string with < and >. In the following, some tags are shown.

<HTML> - - - </HTML>: Denotes that the enclosed portion " - - - " is HTML language.

<HEAD> - - - </HEAD>: Denotes that the enclosed portion is a portion in which document information is stated.

<BODY> - - - </BODY>: Denotes that the enclosed portion is the contents displayed by the browser.

<TITLE> - - - </TITLE>: Denotes that the enclosed portion is the title displayed on the title bar of a window.

<H> - - - </H>: Denotes that document is displayed in the font (bold) and point size specified in the enclosed portion; <H1> being the maximum point size and <H6> the minimum size.

<UL> - - - </UL>: Used to create an unnumbered list.

<LI>: Denotes LISTITEM, prefixed with ●, usually described between <UL> and </UL>.

(Ex.) <UL> (Display result)
<LI> Tokyo ●Tokyo
<LI>Osaka ●Osaka
<LII>Nagoya ●Nagoya
</UL'
<BR>: Denotes LINE FEED.
<HR>: Denotes adding a horizontal line.
<IMG SRC="front.gif">:Image data is read from a front-.gif file for display on the screen.

Typical extensions are as follows:

| | |
|---|---|
| file.txt | Text file |
| file.doc | Document file (for word processing) |
| file.csv | Table file separated by commas |
| file.gif | Graphic file |
| file.jpg | Graphic file (image-compressible) |
| file.dxf | Drawing file (Auto CAD's CAD file) |
| file.c | Source file written in C language |
| file.cpp | Source file written in C++ language |
| file.exe | Excutable file |
| file.class | Part excutable file for JAVA language |
| file.for | Source file written in FORTRAN language |
| file.java | Source file written in JAVA language |
| file.html | Source file written in HTML language |
| file.BAT | Batch file |

Industrial Applicability

As described above, this invention provides templates having a description for performing replacement processing using replacement detection keys, and a parameter table having multiple-dimensional coordinates in which various parameters used in the templates are described. This enables the contents of the parameters to be used from the viewpoints of multiple dimensions, thus making it easy to use expressions, such as "B+" and "B−" described above, or expressions that identify a rectangle, such as "B1:C2".

This invention is adapted to impart to replacement detection keys meanings for coping with specific processing, and meanings for coping with as many types as possible of specific processing by adding tags and extensions. This makes it possible to conduct not only simple replacement processing but also more complicated processing, such as replacement conducted after conditions have been checked.

Furthermore, this invention makes it possible to implement a manuscript text composition system as described above using programs for operating the computer; and the programs can be stored in various appropriate program storage media for storing them.

What is claimed is:

1. A manuscript text composition system comprising:

templates specifying any one or all of texts and images with replacement detection keys so that part of said texts can be replaced with specific characters or character groups, or part or all of said images can be replaced with specific images;

files storing specific characters or character groups and specific images that can be specified by said replacement detection keys;

a parameter table specifying parameters corresponding to said specific characters or character groups and/or specific images in a tabular form having two or more dimensional coordinate axes, wherein one of said templates corresponds to one or a plurality of rows in one coordinate axis in said parameter table;

a compiler to create an image display program using one of said templates, said parameter table and specific characters or character groups and/or specific images stored in one of said templates and said files and specified by said parameters; and a display unit to create a manuscript text in which specific characters or character groups and/or specific images corresponding to one of said templates are pasted based on said image display program.

2. A manuscript text composition system as set forth in claim 1 wherein said templates have a description described in a replaceable manner in terms of voice.

3. A manuscript text composition system as set forth in claim 1 wherein replacement detection keys in said templates specify cells at coordinate positions in said parameter table by the existence of said replacement detection key.

4. A manuscript text composition system as set forth in claim 1 wherein replacement detection keys in said templates specify specific file names or specific command names or specific conditional expression names by the existence of said replacement detection keys.

5. A manuscript text composition system as set forth in claim 4 wherein when said replacement detection keys directly specify specific file names or specific command names or specific conditional expression names by the existence thereof, parameters relating to files or commands or conditional expressions specified by said specifications are described in said parameter table.

6. A manuscript text composition system as set forth in claim 5 wherein when said specific command names or specific conditional expression names are specified, processing including replacement is conducted after said specific commands or specific conditional expressions have been executed.

7. A manuscript text composition system as set forth in claim 1 wherein the name of said one specified template is described in one cell in said parameter table.

8. A manuscript text composition system as set forth in claim 7 wherein in describing the name of said template in one or a plurality of cells in said parameter table, a notation combining a set of "a template identification mark and a template name" is used so as to indicate that individual given cells specify specific "templates".

9. A manuscript text composition system as set forth in claim 1 wherein specific characters or character groups, or specific images being replaced are described directly in one cell in said parameter table.

10. A manuscript text composition system as set forth in claim 1 wherein coordinate values for specifying other cells in said parameter table are described in one cell in said parameter table.

11. A manuscript text composition system as set forth in claim 1 wherein specific file names or specific command names or specific conditional expression names are described in cells in said parameter table.

12. A manuscript text composition system as set forth in claim 11 wherein when specific file names or specific command names or specific conditional expression names are described in cells in said parameter table, parameters relating to said file or command specified by said descriptions are described in said parameter table.

13. A manuscript text composition system as set forth in claim 12 wherein when said specific command names or specific conditional expression names are described, processing, including replacement, is conducted after said specific commands or conditional expressions have been executed.

14. A manuscript text composition system as set forth in claim 1 wherein replacement detection keys in said templates specify by the existence of said replacement detection keys a plurality of cells enclosed by a plurality of coordinate positions in said parameter table.

15. A manuscript text composition system as set forth in claim 1 wherein said replacement detection keys are recognized by said system at the startup of said system by designating predetermined mark characters as said replacement detection keys.

16. A manuscript text composition system as set forth in claim 15 wherein said replacement detection keys are made invalid or valid in subsequent processing by a description in the contents of said template to the effect that replacement detection keys having predetermined specific marks are made invalid or valid in subsequent processing.

17. A manuscript text composition system as set forth in claim 1 wherein said replacement detection keys are specified so that individual processing types for the contents specified by said replacement keys are predetermined for each of two or more combinations of predetermined specific marks.

18. A manuscript text composition system as set forth in claim 1 wherein replacement detection keys in said templates check by the existence of said replacement detection keys to see if a specific object being compared agrees with comparison conditions, and specify different pasting processing, depending on a true case where said specific object agrees with comparison conditions, or a false case where said specific object does not agree with comparison conditions.

19. A manuscript text composition system as set forth in claim 1 wherein replacement detection keys in said templates specify by the existence of said replacement detection keys that the contents of description of other templates be pasted in the contents of description of said template.

20. A program storage medium for storing a program for implementing a manuscript text composition system, said program storage medium comprising:

templates specifying any one or all of texts and images with replacement detection keys so that part of said texts can be replaced with specific characters or character groups, or part or all of said images can be replaced with specific images;

files storing specific characters or character groups and specific images than can be specified by said replacement detection keys;

a parameter table specifying parameters corresponding to said specific characters or character groups and/or specific images in a tabular form having two or more dimensional coordinate axes, wherein one of said templates corresponds to one or a plurality of rows in one coordinate axis in said parameter table;

a compiler to create an image display program using one of said templates, said parameter table and specific characters or character groups and/or specific images stored in one of said templates and said files and specified by said parameters; and a display unit to create a manuscript text in which specific characters or character groups and/or specific images corresponding to one of said templates are pasted based on said image display program.

* * * * *